March 26, 1968 A. E. RISTAU ETAL 3,374,925

AUTOMATIC RECORD DISPENSER

Filed Dec. 1, 1966 2 Sheets-Sheet 1

INVENTORS:
ARNOLD E. RISTAU
ALFRED G. RISTAU

By RONALD E. BARRY
Attorney

INVENTORS

ARNOLD E. RISTAU
ALFRED G. RISTAU

By RONALD E. BARRY

Attorney

United States Patent Office 3,374,925

Patented Mar. 26, 1968

3,374,925

AUTOMATIC RECORD DISPENSER

Arnold E. Ristau and Alfred G. Ristau, Kaukana, Wis., assignors to Melodie Vendor Corporation, Appleton, Wis.

Continuation-in-part of application Ser. No. 451,581, Apr. 28, 1965. This application Dec. 1, 1966, Ser. No. 598,445

3 Claims. (Cl. 221—129)

ABSTRACT OF THE DISCLOSURE

A record dispensing apparatus having a reciprocally movable bar carrying a number of selectively actuated lever type hook arms for engaging one of a number of dispensing devices positioned in close proximity to the bar. Each dispensing device having a crank arm which is engaged by the lever means to simultaneously release a record while moving a holding means into position to prevent the fall of more than one record. On release of the actuating bar the lever means will return to its original position dropping the next record into position to be dispensed.

This invention relates to record dispensing systems and particularly to a fully automatic system for dispensing 45 r.p.m. records.

This application is a continuation-in-part of our copending application Ser. No. 451,581, filed Apr. 28, 1965, now abandoned.

Records are generally sold from display stands with the records displayed for public inspection. The records are arranged according to title and the purchaser selects whatever record he wishes to purchase from the stand. With this system, supervision by employees of the store is kept to a minimum. Since there is little or no supervision in the sale of the records, the theft of 45 r.p.m. records has become a problem and has caused many stores to drop this line of records because of these losses.

One of the principal objects of the present invention is to provide a device for selling 45 r.p.m. records that is theft proof.

Another object of the present invention is to provide a device for the sale of 45 r.p.m. records that requires no supervision and little maintenance.

Another object of the present invention is to provide a device for the dispensing of 45 r.p.m. records which is simple in operation and inexpensive to manufacture.

A further object of the present invention is to provide an improved 45 r.p.m. record dispensing system that makes the sale of such records profitable.

These objects are accomplished by mounting a number of record supporting members within a housing which is inaccessible to the public. Each of the record supporting members is capable of supporting fifteen records and discharging the records one at a time. A coin system is connected to each of the supporting members and on deposit of the proper amount of money, a record will be dispensed from the supporting member. A discharge slot is provided beneath each of the dispensers to allow the discharged record to be picked up by the public.

Each of the record supporting members is provided with a set of spring biased tabs or buttons which are normally retracted into the housing of the supporting member and a pair of flat plates which normally project from the housing. The flat plates are spaced above the buttons a distance equal to the thickness of a record. Records are dispensed from the supporting members by reversing the positions of the plates and button which allows the records to drop onto the buttons and then returning the plates and buttons to their normal position with the records on the supporting member resting on the plate and the record on the buttons dropping off of the supporting member. With this arrangement, it is impossible for anyone to attempt to release records from the supporting members without depositing the proper amount of money in the coni mechanism.

Other objects and advantages of the present invention will become more readily apparent from the following detailed description when read in connection with the accompanying drawings, in which.

Figure 1:
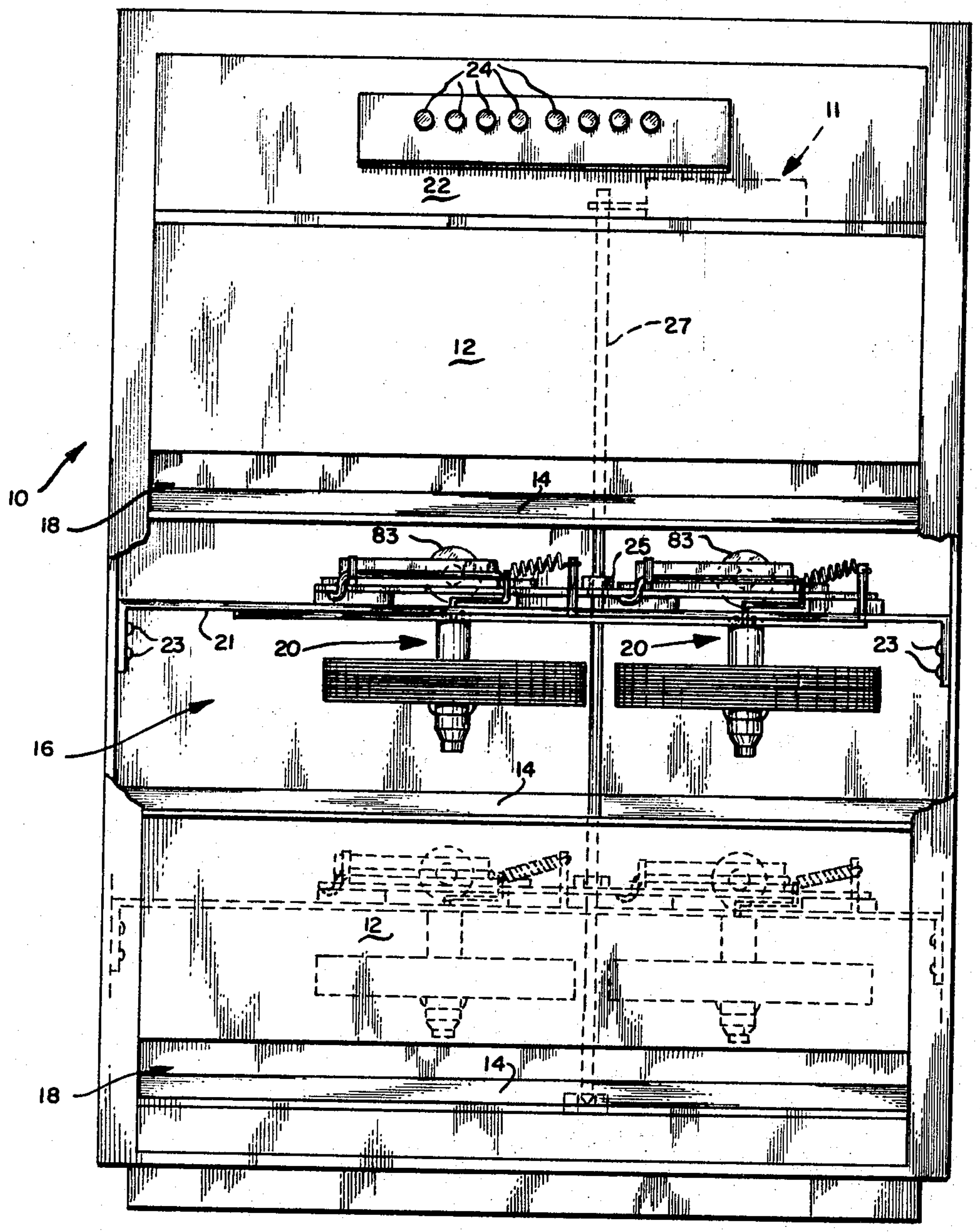
FIG. 1 is a front view of a record dispenser with one section broken away to show the record supporting members.
Figure 5:
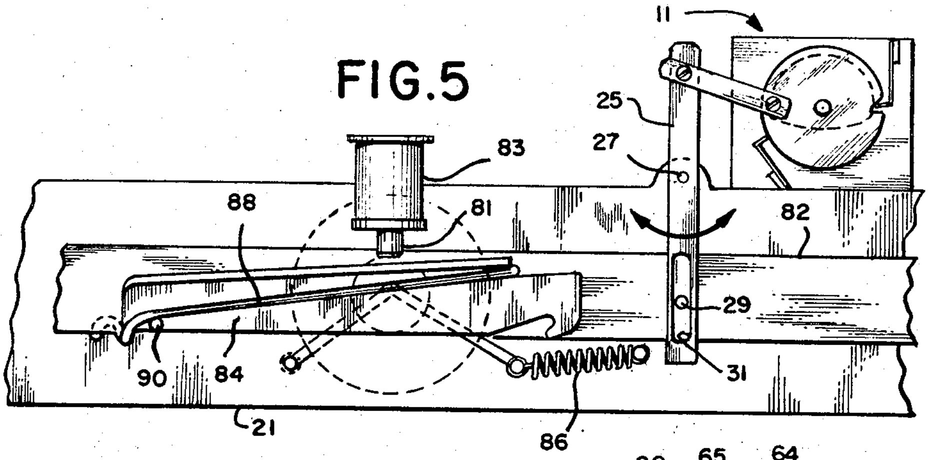
FIG. 5 is a top view of the actuating system for the record dispenser.

Referring to FIG. 1 a record dispenser is shown having a housing or cabinet 10 which is open in the front and divided by panels 12 and sloping shelves 14 into record storage compartments 16. Slots 18 are provided between the panels to allow records which are dispensed from the supporting members 20 to drop onto and slide down shelves 14 to slots 18 where they can be picked up and removed by the purchaser. A selector panel 22 is provided on the top front of the cabinet with a number of selector buttons 24 which are used for selecting the appropriate record. The operation of the selecting system is substantially the same as shown in our copending application Ser. No. 538,513, filed Feb. 17, 1966. The dispenser will normally have five rows of three supporting members each for dispensing fifteen different records with fifteen records on each of the supporting members. The dispenser can be combined with a record player which would play the same fifteen records that are supported in the dispenser so that the purchaser can hear his record prior to making a selection.

Figure 2:
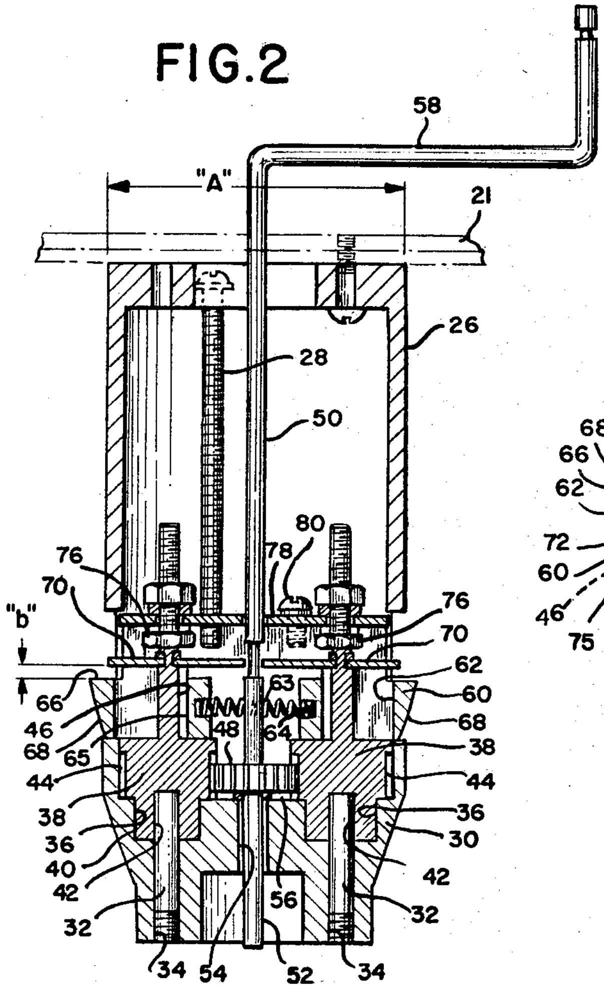
FIG. 2 is a side sectional view of the dispensing member.

The records are dispensed by the individual record supporting members 20 shown in section in FIG. 2. The supporting members are secured to a cross bar 21 that is affixed to the sidewalls of the housing by screw 23. These members include a cylindrical housing 26 having an outer diameter A which is slightly less than the diameter of the center aperture of a 45 r.p.m. record. Attached to the lower end of the cylindrical housing by screws 28 is a tapered member 30 which houses the dispensing system. A pair of pins 32 are secured in apertures 34 in the lower portion of the tapered member and extend upward into circular cavities 36 on the interior of the tapered member. A pair of cam members 38 having a lower section 40 with an outer diameter slightly less than the diameter of cavities 36 are seated in the cavities with pin 32 extending into an aperture 42 in the bottom of the cam member. A gear section 44 is provided at the section immediately above the lower section and cam surface 46 is provided above the gear section.

The cam members are rotated simultaneously by a drive gear 48 secured to a crank pin 50. The lower end 52 of the crank pin projects through a central hole 54 in the tapered member with the drive gear resting on a set of buttons 56. The upper or crank arm 58 of the crank pin extends radially outward from the pin and is actuated as described below.

A pair of dispensing buttons or tabs 60 having rectangular openings 62 are positioned on the cam members with cam surfaces 46 located within the openings. The buttons are biased outward by springs 63 seated in aperture 64 in the buttons. These springs force the back panel 65 on the inside surface of opening 62 against cam surface 46. The outer lip 66 of the button will project outward beyond the outer periphery of the cylindrical housing. It should be noted that the buttons are free to be pushed into the housing when records are pushed upward on the outer tapered surface 68 of the button.

Figure 3:
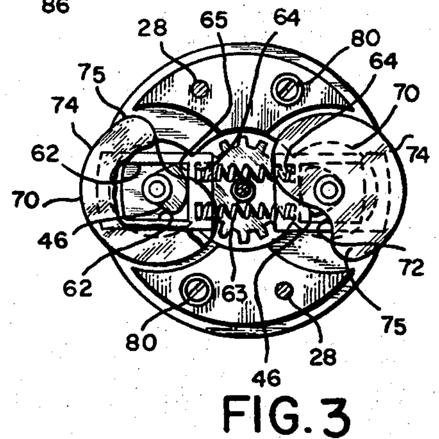
FIG. 3 shows the position of the tabs or buttons and plates in their normal position.

A pair of thin metal discs 70 are rigidly secured to the upper end of the cam members and are cut back at 72 so that the disc will not project beyond the outer periphery of the cylinder when the buttons project outward (FIG. 3). The other side 74 of the disc will project outward beyond the periphery of the housing (FIG. 4) when the cam member is rotated to draw the buttons into the housing. The discs are spaced above the buttons a distance *b* (FIG. 2) which is approximately equal to the thickness of a 45 r.p.m. record. The actuating members are held in position by the heads of screws 76 that are mounted on plate 78 which is secured to the tapered section by screws 80.

Figure 4:
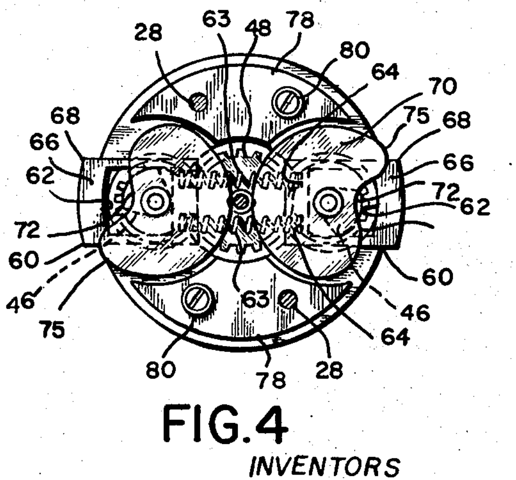
FIG. 4 is taken on line 3—3 of FIG. 2 showing the relative location of the tabs or buttons and plates when rotated through 120°.

In loading any one of the record supporting members the crank arm is rotated through 120° to the position shown in FIG. 4. Records can then be mounted on the housing by sliding them upward past the buttons which are depressed against the bias of the springs by the records acting against the sloped surface 68 of the buttons. Once the housing is filled with records (approximately fifteen), the shaft is rotated to its normal position (FIG. 3) with the side 74 of the discs 70 projecting outward beyond the outer wall of the housing. The records are then supported by the plate. When a record is to be dispensed, the crank pin is rotated 120° to rotate the outer edge 74 of the disc into the housing and allowing the buttons to move outward so that the records can drop onto the lip of the button. The crank pin is then rotated back to its normal position to rotate the disc to the operating or supporting position and to draw the button into the housing. The leading edge 75 of the disc will enter the space between the bottom record and the next record to hold the stack of records on the housing. The bottom record will be free to fall from the support member once the buttons are fully retracted. The disc has a circular or arcuate outer surface and is very thin, making it practically impossible to move the disc to remove records from the housing. The theft of records from the dispenser is thereby prevented.

When the record supporting members are mounted in the cabinet, each row of these members is actuated off of a common bar 82 which is mounted for reciprocal motion on cross bar 21. Any suitable means can be used to actuate the bar 82 when a record is to be dispensed from that row. A lever arm 25 is shown in the drawing pivotally mounted on shaft 27 with pin 29 on bar 82 projecting through slot 31 on the lever. The lever is driven off the timing cams in the selecting system 11 (disclosed in our copending application Ser. No. 538,513, filed Feb. 17, 1966), to reciprocally move the lever arm and bar 82. Each lever arm is keyed to pivot shaft 27 so that all of the bars 82 in the cabinet will move simultaneously with only the actuating solenoid 83 actuating a dispensing device. The crank arms are located in spaced relation to the actuating bar and a solenoid 83 is mounted on cross bar 21 in alignment with each supporting member. Armature 81 of solenoid 83 will move into engagement with hook 84 when the solenoid is energized to rotate hook 84 about pin 90 on the actuating bar to a position where it will engage the crank arm when the actuating bar is moved to the left in the drawing. The hook will engage the crank arm and pull the crank arm through 120° On the return motion of the actuating bar, the crank arm will follow the motion of the bar due to the bias of spring 86. Solenoid 83 will be de-energized on the return stroke allowing the hook to release from the crank arm. Spring 88 will return the hook to its original position on the actuating bar after it has released from the crank arm.

The operation of the coin mechanism and the electrical circuits have not been shown or described since they are well known in this art, and are not considered a part of this invention and although only one embodiment of the present invention has been shown and described it should be apparent that various changes and modifications can be made herein without departing from the scope of the appended claims.

What is claimed is:

1. An automatic record dispenser for 45 r.p.m. records which have a predetermined thickness and a predetermined diameter hole in the center, comprising, a cabinet, a number of record supporting and dispensing members mounted in rows in said cabinet, each of said members including a cylindrical housing having an outside diameter substantially equal to the diameter of said hole in the record, disc means in said housing being mounted for reciprocal motion from an operative record supporting position to an inoperative position within said housing, record supporting tab means positioned below and operatively connected to said disc means and being movable to an inoperative position within said housing when the disc means is in the operative position and to an inoperative position when the disc means is moved to the inoperative position, crank means connected to actuate said disc means and tab means, and a linearly movable actuating means for each row of dispensing members mounted for reciprocal motion within said cabinet, lever means mounted on the actuating means for actuating one of said crank means, whereby a record supported by the disc means on the selected dispensing member will drop to the tab means when the disc means is moved to the inoperative position and said record will drop from the record supporting and dispensing member when the tab means is moved to the inoperative position and the disc means is returned to the operative position.

2. An automatic dispenser according to claim 1 wherein each of said dispensing members includes a pair of drive cams connected to said disc means and positioned to engage said tab means, reciprocally movable gear means connected to said drive cams, an actuating means connected to said gear means and being positioned for selective engagement by said lever means and spring means for biasing said actuating arm to its starting position, whereby on linear motion of said actuating means one of said actuating arms will be rotated through a predetermined arc.

3. An automatic record dispensing device for 45 r.p.m. records which have a predetermined thickness and a predetermined diameter hole in the center, comprising a cabinet, a number of rows of record supporting and dispensing devices in said cabinet, each of said members including rotary first means for supporting a number of records, said first means being movable to an inoperative position allowing said records to fall, reciprocally movable second means spaced below the first means a distance substantially equal to the thickness of the record, rotary means operatively connected to said first and second means to move said first means from its operative to its inoperative positions and the second means from its inoperative to its operative positions,
and linearly movable actuating means for each row of devices, said actuating means including
an actuating member for each dispensing device positioned to engage said rotary means,
whereby on reciprocal motion of said actuating means the selected actuated member will engage said rotary means to dispense a record.

References Cited

UNITED STATES PATENTS

| | | | |
|---|---|---|---|
| 2,679,917 | 6/1954 | Andres | 194—10 |
| 2,868,546 | 1/1959 | Roof | 274—10 |
| 3,015,490 | 1/1962 | Hoffmann | 274—10 |
| 3,072,411 | 1/1963 | Hultquist | 274—10 |
| 3,159,307 | 12/1964 | Stephenson et al. | 221—129 |

WALTER SOBIN, *Primary Examiner.*